United States Patent
Gündogan et al.

(10) Patent No.: US 12,330,516 B2
(45) Date of Patent: Jun. 17, 2025

(54) BATTERY HOUSING FOR A VEHICLE OPERATED BY ELECTRIC MOTOR

(71) Applicant: KIRCHHOFF AUTOMOTIVE DEUTSCHLAND GMBH, Attendorn (DE)

(72) Inventors: Aydogan Gündogan, Plettenberg (DE); Alexander Günther, Olpe (DE); Alexander Schauerte, Kirchhundem (DE); Jan Göbel, Netphen (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 902 days.

(21) Appl. No.: 17/286,099

(22) PCT Filed: Nov. 11, 2019

(86) PCT No.: PCT/EP2019/080868
§ 371 (c)(1),
(2) Date: Apr. 16, 2021

(87) PCT Pub. No.: WO2020/099320
PCT Pub. Date: May 22, 2020

(65) Prior Publication Data
US 2021/0384581 A1 Dec. 9, 2021

(30) Foreign Application Priority Data

Nov. 12, 2018 (DE) .................... 10 2018 128 177.3
Jan. 21, 2019 (DE) .................... 10 2019 101 402.6

(51) Int. Cl.
*H01M 50/24* (2021.01)
*B60L 50/64* (2019.01)
(Continued)

(52) U.S. Cl.
CPC .......... *B60L 50/64* (2019.02); *H01M 50/204* (2021.01); *H01M 50/209* (2021.01);
(Continued)

(58) Field of Classification Search
None
See application file for complete search history.

(56) References Cited

U.S. PATENT DOCUMENTS 10,371,181 B1 * 8/2019 Reibling ................... F16B 2/02
10,723,234 B2 7/2020 Günther
(Continued)

FOREIGN PATENT DOCUMENTS

CN 102403475 A 4/2012
DE 102011111229 A1 2/2013
(Continued)

OTHER PUBLICATIONS

Examination Report dated Sep. 5, 2022 in related Chinese application 201980074174.3.
(Continued)

*Primary Examiner* — Barbara L Gilliam
*Assistant Examiner* — Angela J Martin
(74) *Attorney, Agent, or Firm* — Polson Intellectual Property Law P.C.; Margaret Polson; Christopher Sylvain

(57) ABSTRACT

A battery housing for an electric vehicle comprises a first housing part and a second housing part. The first housing part has a trough-type structure for receiving one or more battery modules. The second housing part is designed as a cover part for closing the first housing part. The housing parts have peripheral assembly flanges and are connected to one another on their assembly flanges by multiple fasteners extending through the assembly flanges. The assembly flange of at least one housing part carries multiple spacing elements arranged spaced apart from one another, each
(Continued)

having a spacer arranged on the side of the assembly flange carrying the spacing element facing the assembly flange of the other housing part, wherein the spacer only covers a part of the total width of the assembly flange. A peripheral seal is located between and adhesively connected to the two assembly flanges. Here, the spacing elements each have at least one arm guided around the lateral edge of the assembly flange carrying the spacing element, and reaching to the opposite side, and supported on the opposite side of the assembly flange.

16 Claims, 5 Drawing Sheets

(51) Int. Cl.
    *H01M 50/20*     (2021.01)
    *H01M 50/204*     (2021.01)
    *H01M 50/209*     (2021.01)
    *H01M 50/22*     (2021.01)
    *H01M 50/224*     (2021.01)
    *H01M 50/249*     (2021.01)
    *H01M 50/26*     (2021.01)
    *H01M 50/262*     (2021.01)
    *H01M 50/291*     (2021.01)
    *H01M 50/293*     (2021.01)

(52) U.S. Cl.
    CPC ....... *H01M 50/224* (2021.01); *H01M 50/249* (2021.01); *H01M 50/262* (2021.01); *H01M 50/291* (2021.01); *H01M 50/293* (2021.01); *H01M 2220/20* (2013.01)

(56) References Cited

U.S. PATENT DOCUMENTS

| | | | |
|---|---|---|---|
| 10,843,577 B2 | 11/2020 | Günther | |
| 10,985,422 B2 | 4/2021 | Gunther et al. | |
| 11,075,416 B2 | 7/2021 | Günther | |
| 11,108,112 B2 | 8/2021 | Günther | |
| 11,205,816 B2 | 12/2021 | Günther | |
| 2010/0136402 A1 | 6/2010 | Hermann et al. | |
| 2011/0143179 A1 | 6/2011 | Nakamori | |
| 2012/0070716 A1* | 3/2012 | Yoshioka | H01M 50/271 429/185 |
| 2014/0120413 A1* | 5/2014 | Nielsen | H01M 50/191 429/185 |
| 2017/0069940 A1* | 3/2017 | Goldstein | H01M 50/545 |
| 2018/0062128 A1 | 3/2018 | Gunther | |
| 2019/0036092 A1 | 1/2019 | Gunther | |
| 2019/0273231 A1 | 9/2019 | Gunther | |
| 2020/0295322 A1 | 9/2020 | Gunther | |
| 2021/0143497 A1 | 5/2021 | Gunther | |
| 2021/0265690 A1 | 8/2021 | Günther | |

FOREIGN PATENT DOCUMENTS

| | | | |
|---|---|---|---|
| DE | 102016110330 A1 | 12/2017 | |
| DE | 102016115037 A1 | 2/2018 | |
| DE | 102017204530 * | 9/2018 | ............ H01M 50/20 |
| DE | 102017204530 A1 | 9/2018 | |
| EP | 2541668 A1 | 1/2013 | |
| EP | 2741343 A1 | 6/2014 | |
| EP | 2916369 A1 | 9/2015 | |
| EP | 2945204 A1 | 11/2015 | |
| WO | 9726782 A2 | 7/1997 | |
| WO | 2015132786 A1 | 9/2015 | |
| WO | WO 2015132786 * | 9/2015 | ............. H01M 2/04 |
| WO | 2018114067 A1 | 6/2018 | |

OTHER PUBLICATIONS

International Search Report dated May 22, 2020 in parent International application PCT/EP2019/080868.
Written Opinion of the International Searching Authority dated May 22, 2020 in parent International application PCT/EP2019/080868.
Examination Report dated Jan. 23, 2019 in priority German application DE 10 2019 101 402 (Google Translate machine translation provided).

* cited by examiner

BATTERY HOUSING FOR A VEHICLE OPERATED BY ELECTRIC MOTOR

BACKGROUND

The present disclosure relates to a battery housing for a vehicle operated by electric motor, having a first housing part and a second housing part, the two housing parts being metal components, and of these, at least one has a trough-type structure for receiving one or more battery modules, and a peripheral assembly flange, and of these, the other housing part is designed as a cover part for closing the first housing part and is also provided with a peripheral assembly flange, wherein the two housing parts are connected to one another on their assembly flanges by multiple fasteners, wherein the assembly flange of at least one of the two housing parts carries multiple spacing elements arranged spaced apart from one another.

In motor vehicles driven by electric motor, such as, for example, in passenger cars, trucks, forklift trucks, commercial vehicles or the like, battery modules are used as energy storage devices. Such battery modules typically are composed of a plurality of individual batteries. Typically, these batteries are high-voltage batteries. The accommodation of such battery modules necessary for operating such a vehicle is subject to certain requirements. It is essential that the battery module(s) is/are protected in their battery housing against outside influences. In addition, an accommodation of the battery module(s) in a battery housing, which is sealed against penetration of moisture, is necessary in order to prevent condensation within the battery housing. The penetration of moisture into the battery chamber of the battery housing can lead to a short circuit and to burning of the battery module triggered thereby.

For the purpose of moisture-proof accommodation of the battery modules, generally consisting of multiple battery cells, in such a battery housing, the housing parts have to be connected to one another in a sealing manner. In US 2010/136402 A1, for the sealing connection of the two housing parts, it is proposed to insert a peripheral seal between the two assembly flanges and to clamp the assembly flanges against one another by means of a plurality of screws. The screws provided for connecting the assembly flanges extend through the assembly flanges with small spacing on the outside with respect to the seal. The use of a plurality of such screws as fasteners is necessary so that the two assembly flanges are peripherally clamped against one another with the same clamping force to the extent possible. If the spacing between two fasteners is excessively large, the result typically is a certain amount of warping between the fasteners, since the clamping force introduced in these regions is smaller.

Occasionally it is necessary that the battery modules contained in a battery housing have to be replaced individually or as a whole. This is time-consuming since, as described above with regard to US 2010/136402 A1, typically a large number of screw fasteners are used for holding the two housing parts together. Therefore, these screw fasteners have to be loosened and, after replacing one or multiple battery modules, they have to be properly assembled again in order to clamp the two housing parts to one another. During the clamping of the two housing parts, one must ensure that all the clamping bolts are clamped with the same force. An uneven clamping of the assembly flanges over the periphery of the housing part can lead to leaks. Due to the large number of fasteners which are used in order to properly connect the two housing parts of a battery housing, this connection technology is also considered to be costly. In order to achieve the desired moisture closure of the battery chambers enclosed by the housing parts with respect to the outside, these disadvantages have been accepted so far due to the lack of known alternatives.

Such battery housings in addition must meet the requirements for electromagnetic compatibility (EMC). This applies particularly to such battery housings which contain not only battery modules but also components for electrical energy management and voltage supply. Therefore, a shielding must meet the EMC requirements both from inside to outside and also from outside to inside. The latter is required so that add-on units contained in the battery housing cannot be accessed or influenced from outside. Openings in metal battery housings such as holes or slits negatively affect the electromagnetic shielding. In order to meet these requirements, the housing parts have to be connected to one another in an electrically conductive manner.

In order to provide an airtight closure between the two housing parts and at the same time an electrical connection of same, in WO 97/26782 A2, a conductive coated sealing element is used. Instead of such seals, which are relatively costly, spring sheets, spring contacts or clip connectors arranged between the housing parts are also used in order to meet the corresponding EMC requirements. In such a design, it is understood that, for the airtight closure, a seal must additionally be arranged between the housing parts. Due to the necessary assembly flange width on which a seal must lie, this is only possible with a correspondingly wide assembly flange. However, in order to optimize the installation space, it would be desirable for the assembly flange of such battery housings to have the smallest width possible.

Furthermore, EP 2 741 343 A1 discloses a battery housing for the accommodation of battery modules, wherein the housing trough and the housing cover are connected by means of support protrusion and prestressing.

US 2011/0143179 A1 moreover discloses a conventional battery housing for the accommodation of multiple battery modules, wherein the housing chamber and the housing cover are connected via bent flanges by means of screw connections.

Occasionally the housing parts of a battery housing are also glued to one another, wherein the adhesive layer in addition assumes the function of the seal. In order to nevertheless achieve an electrical contact between the two assembly flanges of the two housing parts, which are connected to one another by an adhesive layer, it has been proposed to provide one of the two assembly flanges or both assembly flanges with the embossments directed in each case towards the other assembly flange, the embossments being in contact with the surface of the other assembly flange to bring about the desired electrical contact. However, in the case of such a housing part connection, it is disadvantageous, in addition to the necessary width of the flange, that detachment of the cover part from the trough part is hardly possible or possible only with great effort. Cutting open the adhesive layer is not possible due to the embossments of the assembly flanges extending through said adhesive layer. However, for reasons relating to maintenance and/or repair, it is desirable that such a battery housing can also be occasionally opened and in particular without problem to the extent possible.

DE 10 2017 204 530 A1 discloses an arrangement for the positive-locking fastening of a housing cover on a housing lower part of a battery housing for a vehicle. Between the two assembly flanges of the housing cover and of the housing lower part, there is either a peripheral spacing element or a plurality of locally limited spacing elements which are preferably arranged evenly distributed over the course of the assembly flange in question. The housing cover and the housing lower part are held by the snap-in tongues which are guided around from the housing cover over the lateral edge of the assembly flange of the housing lower part. In the cover-closed position, said snap-in tongues grip under the side of the assembly flange of the cover lower part opposite the spacing element. The spacing elements can be part of the respective assembly flange or they are plastic parts glued thereon.

SUMMARY

Proceeding from this background, the present disclosure proposes a battery housing for a vehicle driven by electric motor, having a first and a second housing part, housing parts of which can be connected to one another in a manner which meets the EMC requirements, and which nevertheless does not possess the disadvantages exhibited by the prior art.

This aspect is achieved by a battery housing of the type mentioned at the start, in which the housing parts are connected to one another by multiple fasteners extending through the assembly flanges, and in which the spacing elements each have a spacer arranged on the side of the assembly flange carrying the spacing element facing the assembly flange of the other housing part, wherein the spacer only covers a part of the total width of the assembly flange, and in which a peripheral seal is located between the two assembly flanges and connected adhesively to the two assembly flanges, and in which the spacing elements each have at least one arm guided around the lateral edge of the assembly flange carrying the spacing element, and reaching to the opposite side, and supported on the opposite side of the assembly flange.

In this battery housing, the seal located between the assembly flanges is adhesively connected to the two assembly flanges. Typically, this involves an adhesive connection. Multiple spacing elements are located between the assembly flanges of the two housing parts. Each spacing element has a spacer which is arranged on the assembly flange carrying the spacing element, on the side facing the assembly flange of the other housing part. The spacing between the two assembly flanges is defined by the spacing elements, and thus the sealing gap or adhesive gap is set. The spacing elements can be produced from an electrically conductive material. In that case, no additional measures are necessary in order to provide the desired electrical contact between the two housing parts. The spacers of the spacing elements are preferably made of a soft material which can be cut with a knife. Thus, such a battery housing can be opened simply by cutting open the adhesive connection. The gap provided by the spacing element moreover allows easy introduction of a cutting tool between the two sides of the assembly flanges which face one another.

In an alternative design, the spacing elements are produced from an electrically non-conductive material, typically a plastic. For the necessary electric contacting of the two housing parts, fasteners produced from an electrically conductive material are then used. In such a design, a fastener recess is introduced into the spacer, through which the fastener extends, together with a fastener through-hole of the assembly flanges to be connected to one another. The spacer of a spacing element lies in each case between the mutually aligned fastener bores of the two assembly flanges, in particular with its fastener recess in alignment with the fastener bores of the assembly flanges. If the fasteners are mounted, they put the two housing parts in contact. If the housing parts of the battery housing to be connected are made of a different material, the fasteners are produced from a material such that, to the extent possible, only a slight voltage difference is built up in contact with the respective material of the housing part. Likewise, such a fastener can be coated with such a material. Typically, such a fastener has a head, for example, the head of a fastener inserted as screw, which is then in contact by its underside with the upper side of an assembly flange. The screw shaft engages in a nut arranged on the other assembly flange, for example, a punched nut or a weld nut, so that the electrical connection between the two housing parts is established as soon as the fastener has been engaged with the respective counterparts, that is to say, for example, in each case a nut. Such a screw fastener can also be implemented as a self-tapping screw. In such a design, no threaded nut is provided on the assembly flange into which the self-tapping threading digs. In such a design, the fasteners are used at the same time for a securing or preliminary securing of the housing parts to be connected to one another by the seal, until the compound provided for forming the seal, for example, the adhesive, is cured. The spacers located between the assembly flanges are moreover responsible for effectively preventing overtightening of the fasteners, which could lead to deformation and thus to leaks of the assembly flanges.

The spacers of the spacing elements can be designed to be quite small, so that they only cover a part of the width of an assembly flange. The remaining width can then be used for the necessary sealing. With this design, the possibility exists of using a peripheral design of a seal having the necessary width despite the arrangement of the spacer, without having to increase the outer size of the battery housing.

The spacing elements are typically preassembled on one of the two assembly flanges to be connected to one another. This can be provided by an adhesive connection. In another design, the spacing element is designed in the manner of a slip-on clip, wherein an arm is formed on the spacers to be positioned between the assembly flanges. This arm is guided around the external edge of the assembly flange and extends to the upper side of the assembly flange opposite the spacer. On said assembly flange, the arm is supported on this upper side of the assembly flange, typically prestressed, so that it is fixed in place. In a development, it is provided that the arm carries one or more snap cams on its side facing the assembly flange, snap cams which engage in each case in a snap cam recess introduced into the assembly flange. Such a spacing element mounted on the assembly flange is then connected thereto by a positive-locking connection. In a design in which the spacer of the spacing element comprises a fastener recess, the arm guided around the external edge of the assembly flange is forked in its section extending over the upper side of the side of the assembly flange opposite the spacer. In this section, the spacing element has two arm segments. They are spaced apart sufficiently so that between them the head of a fastener can engage in order to bring the assembly flange in contact with its head underside. In such a design, an arm segment is in each case located on each side of the fastener recess of the spacer.

In order to facilitate the mounting of a spacing element designed in this manner, the arm has or the two arm segments have, on the front end thereof, in each case an angled arm end piece which is angled so that it faces away from the assembly flange. These arm end pieces are used for guiding and for the facilitated introduction of the assembly flange into the U-shaped recess of the spacing element, which is formed by the spacer and the arm, respectively arm segments, extending around the external edge of the assembly flange.

In a spacing element, the spacer of which can comprise a fastener recess, said recess can be open in the direction of the battery volume of the battery housing. Thereby, the width of the spacer, by which said spacer lies on the two assembly flanges, is reduced. The opening is undercut, according to an embodiment example, in the direction of the fastener recess. This enables a design in which the fastener recess has a slightly smaller diameter than the diameter of the fastener extending through this fastener recess. A fastener inserted therein is then held therein in the course of the required elastic widening of the fastener recess due to the prestressing acting on the shaft of the fastener. This enables a preassembly of the spacing element together with the fasteners on the assembly flange of one of the two housing parts and also enables handling this housing part without the spacing elements or the fasteners falling out of or away from the assembly flange. In such a preassembly of in each case a spacing element and a fastener extending through said spacing element, a positive-locking connection of the spacing elements on the assembly element is implemented by the fastener, so that, if the spacing element has one or more snap cams, they alone can be used for preliminarily securing the spacing element on the assembly flange until the fastener is introduced.

In a design in which the spacing element has an arm guided around the external edge of the assembly flange, it can be provided that, in the section in which such a spacing element is to be arranged, the assembly flange carrying such a spacing element has a notch proceeding from its external edge. The depth of the notch typically corresponds to the material thickness of the section of the arm of the spacing element in the section located on the external edge of the assembly flange. In such a design, the spacing element does not protrude in relation to the battery housing with respect to the rest of the assembly flange in radial direction. Likewise, it is equally possible to use a design wherein the notch does not correspond to the entire material thickness of this section of the arm. In that case, the arm section still only protrudes by part of its material thickness beyond the external edge of the assembly flange, when it is connected thereto.

In case of the seal, according to a design, one uses a seal which is applied as a paste and which, after its curing, glues the assembly flanges of the two housing parts to one another. Here, it is possible to use an adhesive or else a sealing foam.

BRIEF DESCRIPTION OF THE DRAWINGS

The following description is provided in reference to the appended figures using example embodiments, wherein:

FIG. 2b shows an enlarged detail view of the area marked in FIG. 2a,

DETAILED DESCRIPTION

Figure 1:
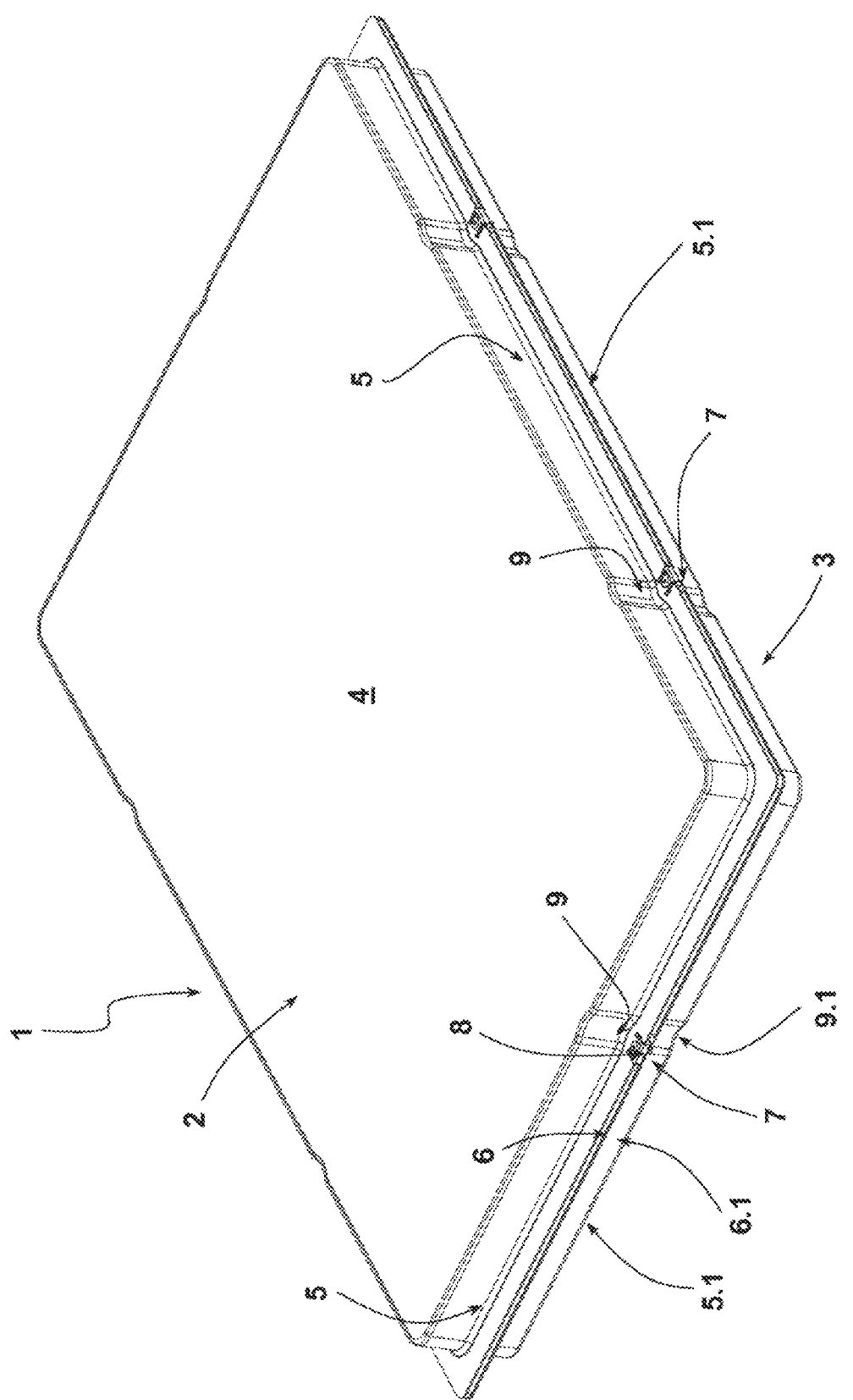
FIG. 1 shows a perspective view of a battery housing.

With reference to FIG. 1, a battery housing 1 comprises an upper housing part 2 used as cover part and a lower housing part 3 having a trough-type structure. In the embodiment example shown as an example in the figures, the two housing parts 2, 3 are identical. Therefore, the upper housing part 2 also has a trough-type structure. The battery housing 1 is used for receiving multiple battery modules and it is designed to be mounted in or on a vehicle. For equipping a vehicle with the necessary battery volume, it is certainly possible to install multiple battery housings 1 equipped with battery modules in an adjacent arrangement. Not only the multiple battery modules but also the necessary power electronics are located in the battery housing 1. For the sake of simplicity, cable outlets are not represented in the figures.

In the upper housing part 2, which like the lower housing part 3 has a trough-type structure, the trough-type structure is formed by a bottom 4 which, in the upper housing part 2, is in fact a cover, and by side walls 5 formed thereon. On the side walls 5, a peripheral assembly flange 6 which protrudes facing outward away from the trough volume is formed. The upper housing part 2 is a component produced from a steel plate by a deep drawing process.

In the assembled position of the two housing parts 2, 3, shown in FIG. 1, said housing parts are arranged with the open side of their trough-type structure facing one another. In this arrangement (see FIG. 1), the assembly flanges 6, 6.1 of the two housing parts 2, 3 are held so they face one another. The sides of the assembly flanges 6, 6.1 which face one another are held spaced apart from one another by spacing elements 7. Between the sides of the assembly flanges 6, 6.1 which face one another, an adhesive seal is arranged, by means of which the two housing parts 2, 3 are glued to one another via their assembly flanges 6, 6.1. Where the spacing elements 7 are located, a screw fastener 8 in each case extends through the assembly flanges 6, 6.1, by means of which screw fastener an electrical connection between the two housing parts 2, 3 is established.

In the represented embodiment example, the spacing elements 7 are located in positions of the assembly flanges 6, 6.1 where the respective side walls 5, 5.1 have a curved embossment 9, 9.1, which in each case is directed into the trough volume. These embossments 9, 9.1 are used for connecting struts crossing the respective trough volume of each housing part 2, 3, by means of which struts, a compartment for receiving in each case a battery module is formed in the trough volume of each housing part 2, 3. At the same time, by means of the embossments 9, 9.1, the width of the assembly flanges 6, 6.1 in the regions of the embossments 9, 9.1 is increased by an amount corresponding to the size of the embossment 9, 9.1.

Figure 2A:
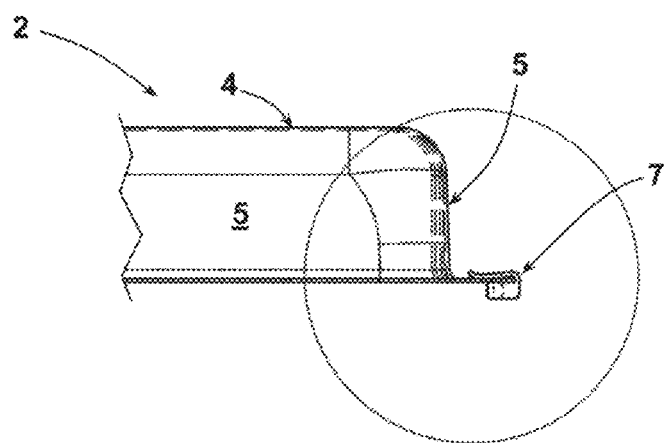
FIG. 2a shows a partial side view of the upper housing part of FIG. 1.
Figure 2B:
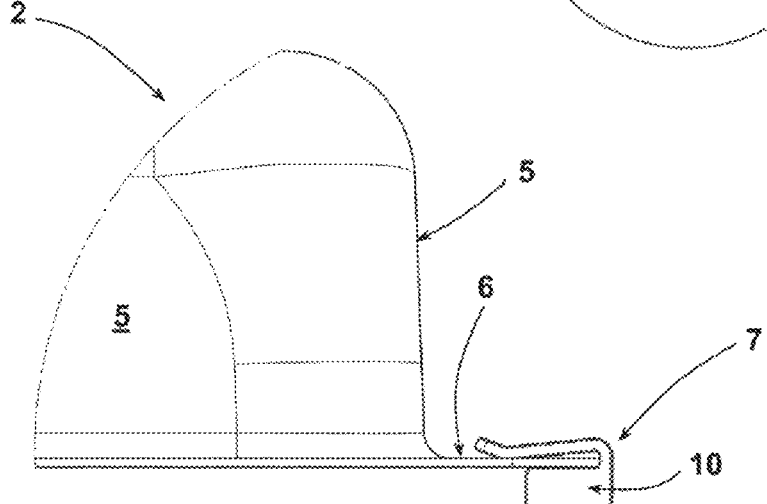

In FIGS. 2a and 2b, the upper housing part 2 used as cover part is shown in a partial side view with a spacing element 7 fastened thereto. The spacing element 7 of the embodiment example described in the figures is a plastic part. The material of the spacing element 7 is sufficiently hard so that thereby a defined spacing gap between the assembly flanges 6, 6.1 can be provided. On the other side, the plastic material is sufficiently soft so that it can be cut through in the plane of the assembly flange 6 with a knife, typically an electric knife.

Figure 3:
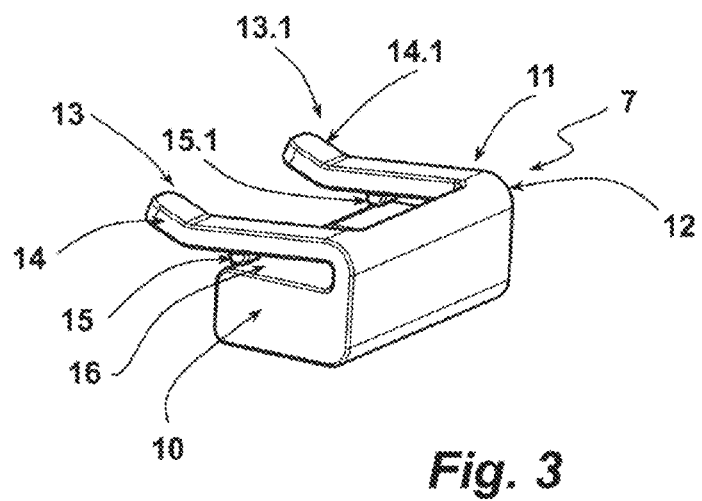
FIG. 3 shows a perspective view of a spacing element.

In FIG. 3, the spacing element 7 is shown alone in a representation in perspective. The spacing element 7 has a cuboid body as spacer 10. As can be seen in FIG. 2b, the spacer 10 is located on the side of the assembly flange 6 which faces the assembly flange 6.1 of the lower housing part 3. An arm 11 is formed on the spacer 10. The arm 11 has a first curved section 12 which is guided around the external edge of the assembly flange 6. After the curved section 12, the arm 11 is divided into two arm segments 13, 13.1. The two arm segments 13, 13.1 are spaced apart from one another, and namely sufficiently far apart so that the head of a screw fastener 8 fits in between them. The arm segments 13, 13.1 are angled facing in the direction of the side wall 5 of the upper housing part 2 and away from the assembly flange 6. These angled arm end pieces 14, 14.1 are used for a facilitated mounting of the spacing element 7 on the assembly flange 6. On the underside and thus on their side facing the assembly flange 6, the arm segments 13, 13.1 carry in each case a snap cam 15, 15.1. The arms 13, 13.1 are designed so that, by their side facing the assembly flange 6, under a certain prestressing, they lie on the surface of the assembly flange 6. By means of the arm 11 with its arm segments 13, 13.1, the curved section 12, and the spacer 10, a U-shaped assembly flange recess 16 is provided.

Figure 4:
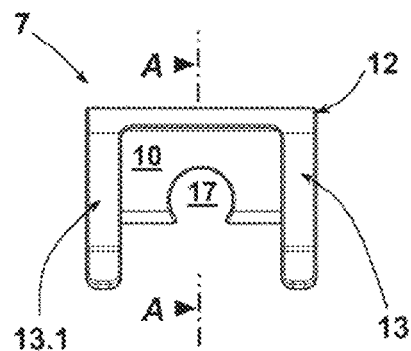
FIG. 4 shows a top view of the spacing element of FIG. 3.
Figure 5:
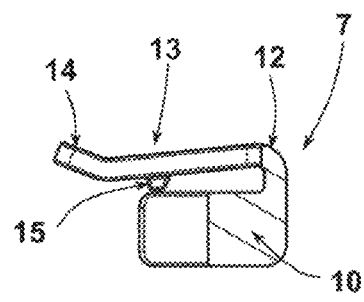
FIG. 5 shows a cross-sectional view along line A-A through the spacing element of FIG. 4.

As can be seen in FIG. 4, the cuboid spacer 10 of the spacing element 7 is perforated by a fastener recess 17 (see also FIG. 5). The fastener recess 17 is open facing away from the curved section 12 of the arm 11. This has two effects: On the one hand, the width necessary for the spacer 10 between the assembly flanges 6, 6.1 is reduced thereby. On the other hand, this enables a design in which the inner diameter of the fastener recess 17 is dimensioned to be slightly smaller than the outer diameter of the shaft of a screw fastener 8. Using the elastic material properties of the spacing element 7 or of its spacer 10, a screw fastener 8 extending by means of its shaft through the fastener recess 17 is held with respect to the spacing element 7 by contact pressure of the inner lateral surface of the fastener recess 17 onto the lateral surface of the screw fastener 8. This facilitates handling the individual elements during the assembly. When the shaft of the screw fastener 8 is inserted, the inner diameter of the fastener recess 17 widens because, due to the above-described opening, the parts of the spacer 10 facing the arm segments 13, 13.1 are slightly displaced.

Figure 6A:
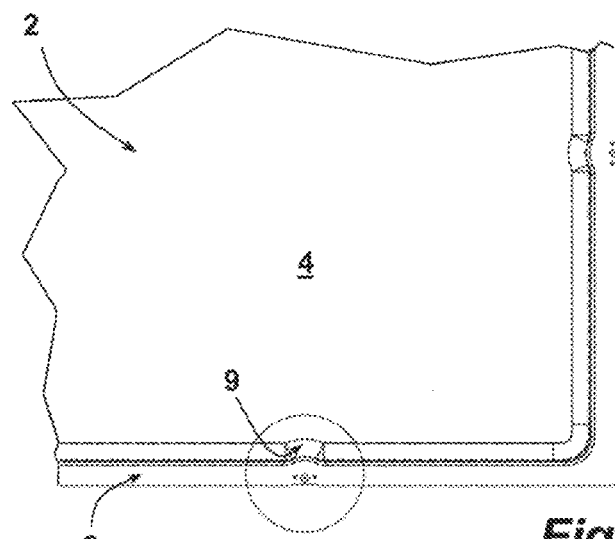
FIG. 6a shows a partial top view of the upper housing part of the battery housing of FIG. 1.
Figure 6B:
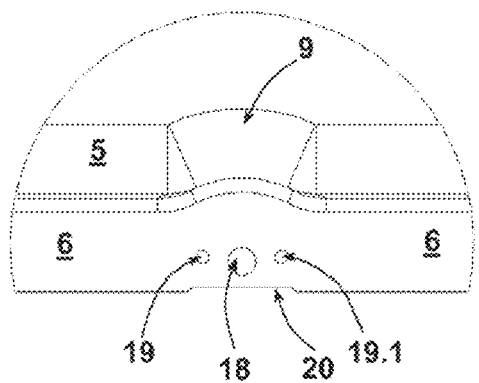
FIG. 6b shows an enlarged detail view of the area marked in FIG. 6a, FIG. 7a shows a partial cross-sectional view through the battery housing of FIG. 1.

Such a spacing element 7 is mounted on the assembly flange 6 in the region of an embossment 9. FIGS. 6a and 6b show, in a top view onto the upper housing part 2, such an embossment 9 and the assembly flange 6 formed thereon. In the region where a spacing element 7 is to be mounted or is mounted, a fastener through-hole 18 is located in the assembly flange 6. Said fastener through-hole is used for passing the shaft of a screw fastener 8 through. Adjacent to the fastener through-hole 18, two snap cam recesses 19, 19.1 are arranged, which can be seen particularly in the detail enlargement of FIG. 6b. Like the fastener through-hole 18, they are bores or punched holes extending through the assembly flange 6. The snap cam recesses 19, 19.1 are used for receiving in each case a snap cam 15, 15.1 of the spacing element 7. If a spacing element 7 is mounted on the assembly flange 6 at the site shown in FIGS. 6a and 6b, the snap cams 15, 15.1 in each case engage in a snap cam recess 19, 19.1, so that the spacing element 7 is then held captive on the assembly flange 6. The upper housing part 2, equipped with the spacing elements 7, can then be easily handled and namely without the risk of the spacing elements 7 slipping or falling off.

Proceeding from the external edge of the assembly flange 6, a notch 20 is located in the region in which a spacing element 7 is to be mounted. The depth of the notch 20 corresponds approximately to the material thickness of the curved section 12. Thus, the curved section 12 of a spacing element 7 does not protrude or at least does not protrude significantly beyond the remaining external edge of the assembly flange 6 when mounted thereon.

Figure 7A:
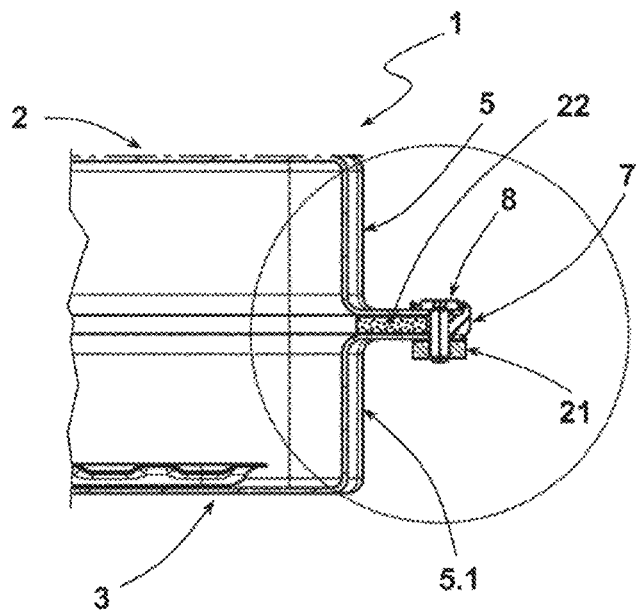
FIG. 7b shows an enlarged detail view of the area marked in FIG. 7a, and FIG. 8 shows a partial cross-sectional view of an additional battery housing.
Figure 7B:
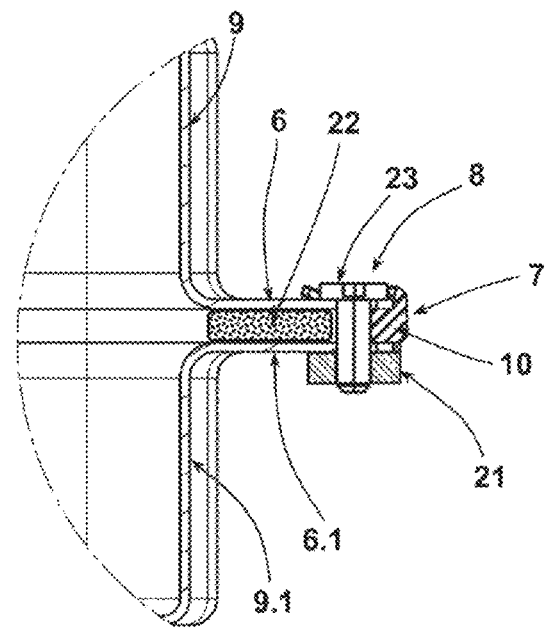

In the embodiment example represented, due to the above-described design of the fastener recess 17, it is also possible to pre-mount the screw fasteners 8. Due to the frictional connection, the screw fasteners are held in their position in each case in several fastener recesses 17 extending through the assembly flanges 6, 6.1. Thus, the upper housing part 2, equipped not only with the spacing elements 7 but also with the necessary screw fasteners 8, can be easily handled. Such handling is necessary when the upper housing part 2 is to be connected to the lower housing part 3. For this purpose, on the assembly flange 6.1 of the lower housing part 3 equipped with battery modules or also on the assembly flange 6 of the housing part 2, a pasty adhesive sealing compound is applied. The application of this pasty compound is carried out so that, after the positioning and connection of the assembly flanges 6, 6.1 of the two housing parts 2, 3, this compound is present between the assembly flanges 6, 6.1 in the required width extent with respect to the width of the assembly flanges 6, 6.1. If the two housing parts 2, 3 are assembled by means of their assembly flanges 6, 6.1 facing one another, and if the screw fasteners 8 are screwed by means of their shaft in each case into a weld nut 21 located on the underside of the assembly flange 6.1 of the lower housing part 3 (see FIGS. 7a and 7b), the battery housing 1 is closed. After curing the pasty compound, said pasty compound at the same time forms a seal and the desired adhesive connection between the assembly flanges 6, 6.1. In FIGS. 7a and 7b, the peripheral seal by means of which the assembly flanges 6, 6.1 of the housing parts 2, 3 are glued to one another is identified with the reference numeral 22. This cross-sectional representation also clearly shows that, by means of the opening of the fastener recesses 17, the seal 22 can reach the shaft of the fastener screws 8.

For the electrical connection of the two housing parts 2, 3, the underside of the screw head 23 of the screw fastener 8 is in contact with the upper side of the assembly flange 6 shown in FIGS. 7a and 7b. The engagement of the screw shaft in the weld nut 21 at the same time establishes the electrical contact which is also ensured by the weld connection between the weld nut 21 and the assembly flange 6.1 of the lower housing part 3.

Due to the spacer 10 located between the assembly flanges 6, 6.1, through which the screw fasteners 8 extend, there is also no risk that, due to unintended overtightening, the spacing of the assembly flanges 6, 6.1 with respect to one another might be decreased and possibly result in a warping forming adjacently. In the represented embodiment example, the screw fasteners 8 ultimately are only used for securing the two housing parts 2, 3 to one another as long as the pasty compound 22 forming the seal has not yet cured and fully deployed its adhesive effect. The screw fasteners 8 moreover are used to ensure the desired electrical connection between the two housing parts 2, 3.

If the battery housing 1 is to be opened, the screw fasteners 8 are loosened. Then the adhesive connection is cut open. The spacing elements 7 made of plastic here do not interfere. In order to close the two housing parts 2, 3, the assembly flange surfaces facing one another are cleaned, and the assembly flange 6 of the upper housing part 2 is again equipped with spacing elements 7 and the screw fasteners 8 are pre-mounted, before the housing parts 2, 3 are glued to one another with the pasty sealing compound, as described above.

Since the two housing parts 2, 3 are glued in order to be held together, the number of the screw fasteners 8 used can be reduced to a small number in comparison to previously known battery housings of this type.

Figure 8:
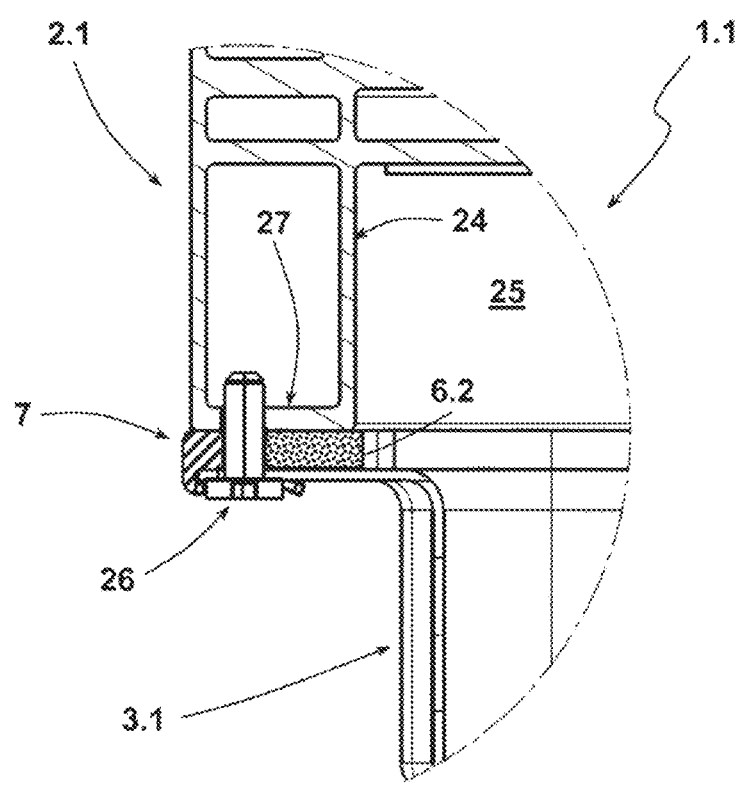

FIG. 8 shows a partial cross-sectional representation of an additional battery housing 1.1, the lower housing part 3.1 thereof is designed exactly like the lower housing part 3 of the battery housing 1 as described above with regard to the previous figures. The battery housing 1.1 differs from the battery housing 1 by the design of its upper housing part 2.1. The assembly flange 6.2 of the upper housing part 2.1 is part of a multi-chamber extruded profile 24 as part of the cover part formed by the upper housing part 2.1. This design clearly shows that the assembly flange 6.2 of the upper housing part 2.1 is arranged so that it also protrudes outward with respect to the cover volume 25 but is not accessible from its upper side. In this embodiment example, self-tapping screws are provided as screw fasteners 26, which, by means of their self-tapping threading, are firmly inserted in the leg 27 of the extruded section 24 providing the assembly flange 6.2.

As in the embodiment example of the battery housing 1, a spacing element 7 is located between the assembly flange 6.2 and the assembly flange of the lower housing part 3.1.

The design shown in FIG. 8, due to the trough-type design of the cover part referred to as upper housing part 2.1 therein, can also be reversed, wherein the housing part 2.1 is the lower housing part and the deep-drawn housing part 3.1 is the upper housing part.

The invention has been described in reference to the figures using example embodiments. Additional design possibilities exist, for example, in terms of the type of preliminary securing of the spacing elements on an assembly flange. Instead of providing snap cams, as described in the context of the described example, a spacer can also have a collar protruding upward in the region of the opening of its fastener recess, which, after mounting of the spacing element, engages in a fastener through-hole of the assembly flange. Likewise, instead of a welding nut, as provided in the described example, a nut of another type can be made, for example, by flaring in the context of the creation of the fastener through-hole in the complementary assembly flange.

In addition, for a person skilled in the art, numerous embodiments and possibilities arise for implementing the invention within the scope of the valid claims, without there being any need to explain or show this in greater detail in the context of this disclosure.

LIST OF REFERENCE NUMERALS

- 1, 1.1 Battery housing
- 2, 2.1 Upper housing part
- 3, 3.1 Lower housing part
- 4 Bottom
- 5, 5.1 Lateral wall
- 6, 6.1, 6.2 Assembly flange
- 7 Spacing element
- 8 Screw fastener
- 9, 9.1 Embossment
- 10 Spacer
- 11 Arm
- 12 Curved section
- 13, 13.1 Arm segment
- 14, 14.1 Arm end piece
- 15, 15.1 Snap cam
- 16 Assembly flange accommodation
- 17 Fastener recess
- 18 Fastener through-hole
- 19, 19.1 Snap cam accommodation
- 20 Notch
- 21 Weld nut
- 22 Seal
- 23 Screw head
- 24 Extruded profile
- 25 Cover volume
- 26 Screw fastener
- 27 Leg

The invention claimed is:

1. A battery housing for a vehicle operated by electric motor, comprising:
    a first housing part and a second housing part, both housing parts being metal components, wherein the first housing part has a trough-shape structure for receiving one or more battery modules and a peripheral assembly flange, wherein the second housing part is designed as a cover part for closing the first housing part and also has a peripheral assembly flange, and wherein the two housing parts are connected to one another by multiple fasteners extending through the assembly flanges,
    wherein the assembly flange of at least one of the two housing parts carries multiple spacing elements arranged spaced apart from one another, and each spacing element has a spacer arranged on a side of the assembly flange carrying the spacing element facing the assembly flange of the other housing part, wherein the spacer only extends over a part of the total width of the assembly flange, and wherein each spacing element has at least one arm integrally formed thereon and guided around the lateral edge of the assembly flange carrying the spacing element, reaching to an opposite side thereof, and supported on the opposite side of the assembly flange, and
    wherein a peripheral seal is located between the two assembly flanges and connected adhesively to the two assembly flanges.

2. The battery housing of claim 1, wherein the spacer of the spacing element is a cuboid body.

3. The battery housing of claim 1, wherein the spacers of the spacing elements each comprise a fastener recess extending therethrough and, between the assembly flanges of the two housing parts, the spacers are each arranged with the fastener recess aligned with a respective fastener through-hole extending through the assembly flanges, and wherein the fasteners extend through the fastener recesses of the spacers for connecting the two assembly flanges.

4. The battery housing of claim 3, wherein the arm extends from the spacer and, after a curved section of the arm guided around the lateral edge of the assembly flange, the arm is divided into two arm segments spaced apart from one another, wherein each of the two arm segments is arranged on a different side of the fastener recess of the spacer.

5. The battery housing of claim 4, wherein at least one of the two arm segments, on a side thereof facing the surface of the assembly flange, carries a snap cam which engages in a snap cam recess arranged adjacent to the fastener through-hole.

6. The battery housing of claim 4, wherein the two arm segments each comprise an angled arm end piece facing away from the assembly flange.

7. The battery housing of claim 3, wherein the fastener recesses of the spacing elements, which extend through the spacers, are each open on a side thereof facing a battery volume of the battery housing.

8. The battery housing of claim 7, wherein the openings of the fastener recesses are undercut in the direction of the respective fastener recess.

9. The battery housing of claim 3, wherein the spacer of the spacing element is a cuboid body.

10. The battery housing of claim 3, wherein the fasteners, which extend through the assembly flanges and the fastener recesses of the spacing elements, put the two assembly flanges in electrical contact with one another.

11. The battery housing of claim 1, wherein the spacing elements are plastic parts.

12. The battery housing of claim 1, wherein the lateral edge of the assembly flange carrying the spacing elements comprises notches in sections of the assembly flange in which the spacing elements are located.

13. The battery housing of claim 12, wherein the depth of each notch corresponds to the material thickness of a section of the arm of the spacing element, which is guided over the lateral edge of the assembly flange.

14. The battery housing of claim 1, wherein the seal located between the two assembly flanges is a seal which is applied as a paste and subsequently cured.

15. The battery housing of claim 1, wherein the fasteners extending through the assembly flanges put the two assembly flanges in electrical contact with one another.

16. The battery housing of claim 1, wherein the fasteners are screw fasteners.

* * * * *